United States Patent [19]

Osborn et al.

[11] Patent Number: 5,662,004

[45] Date of Patent: Sep. 2, 1997

[54] VEHICLE SHIFT CABLE CONNECTION

[75] Inventors: Charles Osborn; Andrew K. Ruiter, both of Spring Lake, Mich.

[73] Assignee: Grand Haven Stamped Products, Div. of JSJ Corporation, Grand Haven, Mich.

[21] Appl. No.: 375,344

[22] Filed: Jan. 19, 1995

[51] Int. Cl.⁶ ............................. F16C 1/12; B60K 20/04
[52] U.S. Cl. ........................... 74/502.4; 74/475; 74/538
[58] Field of Search ........................ 74/475, 538, 502.4, 74/502.6

[56] References Cited

U.S. PATENT DOCUMENTS

| | | | |
|---|---|---|---|
| 3,151,496 | 10/1964 | Winchell | 74/475 X |
| 3,998,109 | 12/1976 | O'Brien | 74/475 |
| 4,126,054 | 11/1978 | Langford et al. | 74/538 X |
| 4,333,361 | 6/1982 | Spease | 74/502.4 |
| 4,546,665 | 10/1985 | Bieber | 74/475 X |
| 4,884,467 | 12/1989 | Martell | 74/502.4 X |
| 5,156,061 | 10/1992 | Ishizuki et al. | 74/475 |

*Primary Examiner*—Charles A. Marmor
*Assistant Examiner*—Mary Ann Battista
*Attorney, Agent, or Firm*—Price, Heneveld, Cooper, DeWitt & Litton

[57] ABSTRACT

A cable connector for a vehicle shifter includes an anchor configured to mateably receive a sheath of a cable assembly, and further includes a connector rod configured to receive a telescopable cable rod extending from the cable assembly. The vehicle shifter includes a base having a bracket supporting the anchor, and a shift mechanism pivotally attached to the base and operably connected to the connector rod. The shifter is installed in the vehicle by manipulating the shifter so that the sheath is inserted into the anchor with the cable rod extending through the anchor into the connector rod. The shifter is secured to the vehicle by clips that snap attach to a vehicle mounting bracket. The anchor is secured to the sheath by a first spring clip, and the cable rod is secured to the connector rod by a second spring clip,. which clips snap attach to the respective parts of the cable assembly as the shifter is snap attached to the vehicle.

28 Claims, 3 Drawing Sheets

Fig. 3

VEHICLE SHIFT CABLE CONNECTION

The present invention concerns a vehicle shift cable connection, and more particularly concerns a cable connection for an automatic transmission shifter that is configured to facilitate efficient connection during assembly.

In known cable-type automatic transmission shifters for vehicles, a cable assembly is typically operably attached to the shifter with a two step process that includes securing a molded-on sheath on the cable assembly to a base of the shifter, and securing a telescopable cable on the cable assembly to a shift mechanism on the shifter. Further, the shifter is attached to the vehicle in a separate step. Fasteners permitting relatively quick attachment have been used to attach the cable assembly to the shifter to make the assembly process more efficient. However, if the loose shifter-engaging end of the cable assembly is not found in a desired pre-assembly location in the vehicle, the operator must then search for the cable assembly before making the connections to the shifter. Also, it is noted that the inside of a vehicle is not particularly conducive to installation. For example, it may be difficult to see the cable assembly and the shifter, and hence difficult for an operator to make the connection and/or to see that the connection is properly securely made. Notably, it is not new to operably connect the end of a cable to a shifter, such as is noted above, nor is it new to operably interconnect ends of aligned shift cables to form a single longer shift cable. However, a connection arrangement providing improved and more time efficient connection of the cable assembly to the shifter is desired.

Thus, a vehicle shifter cable connector solving the aforementioned problems, and that is configured to facilitate secure efficient interconnection during assembly, is desired.

SUMMARY OF THE INVENTION

The present invention includes a cable connector for operably connecting a cable assembly to a vehicle shifter, the cable assembly including a sheath and a telescopable cable rod extending from the sheath. The cable connector includes an elongated cable anchor having a nose configured to mateably engage an apertured flange on the vehicle shifter. The cable anchor has a bore extending entirely through the cable anchor, one end of the bore being configured to mateably receive the sheath with at least a portion of the cable rod extending beyond the nose of the cable anchor. The cable connector further includes a connector rod having a first end configured to receive the telescopable cable rod and a second end configured for connection to a shift mechanism on the vehicle shifter. In a preferred form, the cable assembly is first installed on the vehicle and the shifter and cable connector are then snap fitted onto the cable assembly. This is accomplished by the cable anchor, the sheath, the connector rod and the telescopable cable rod being configured to snap attach as the vehicle shifter is manipulated into an installed position in the vehicle.

An object of the present invention is to provide a connection arrangement in which a sheath and a telescopable cable of a cable assembly simultaneously snap attach to a shifter base and a shift mechanism of a shifter, respectively, during assembly of a vehicle.

Another object of the present invention is to provide a connection arrangement in which at least one of a sheath and a telescopable cable of a cable assembly align and operably attach to a shifter during installation of the shifter in a vehicle.

These and other features, advantages and objects of the present invention will be further understood and appreciated by those skilled in the art by reference to the following specification, claims and appended drawings.

DETAILED DESCRIPTION OF PREFERRED EMBODIMENT

Various terms such as "upwardly," "downwardly," "rearwardly," "forwardly" and the like are used herein to describe the shifter as oriented in a vehicle, to facilitate a clear description. However, the use of these words is not intended to be unnecessarily limiting, and it is specifically contemplated that the arrangement can assume various orientations.

An apparatus 10 (FIG. 1) embodying the present invention includes a shifter 12 configured to be operably simultaneously connected to a shift cable assembly 14 by a cable connector 16 as the shifter 12 is installed in a vehicle 17. The cable connector 16 includes an anchor 18 configured to mateably receive a sheath 20 of the cable assembly 14, and further includes a connector rod 22 configured to receive a telescopable cable rod 24 (FIG. 2) extending from the cable assembly 14. The vehicle shifter 12 includes a flange 26 for supporting the anchor 18, and a pivoting shift mechanism 28 operably attached to the connector rod 22. The shifter 12 is installed in the vehicle by manipulating the shifter 12 to insert the sheath 20 into the anchor 18 with the cable rod 24 extending through the anchor 18 into the connector rod 22. As the shifter 12 is moved to the installed position, it snap attaches to the vehicle. A first spring clip 30 on the anchor 18 automatically snap attaches anchor 18 to sheath 20 as part of the installation of the shifter to the vehicle, and simultaneously therewith a second spring clip 32 on the connector rod 22 automatically snap attaches the cable rod 24 to the connector rod 22. Thus, the entire cable and shifter installation and hook up are completed by manipulating the shifter 12 and then moving it into position in the vehicle.

More particularly, the vehicle includes shifter mounting brackets 40 and 41 (FIG. 1) attached to vehicle floor pan 42. Shifter mounting bracket 40 is generally U-shaped, and includes a center panel 43 engaging floor pan 42, and front and rear legs 44 and 45 that extend generally upwardly, respectively, from center panel 43. Front leg 44 (FIG. 3) includes an aperture 46 and a slot 47 extending into aperture 46 from an upper edge 48 of leg 44. Rear leg 45 includes an upper edge 49 having an arcuate section 50 that is generally aligned with aperture 46. A pair of spaced square holes 51 are located in leg 45 generally diagonally downwardly from arcuate section 50. Square holes 51 are shaped to mateably engage Z clips 85 on shifter 12, as described hereinafter. Legs 44 and 45 are spaced apart and are generally parallel. Legs 44 and 45 are oriented nearly perpendicularly to floor-engaging panel 45, but are angled forwardly slightly to facilitate unobstructed installation of shifter 12 and anchor 18 into bracket 40. Specifically, the aperture 46 on front leg 44 and the arcuate section 50 on leg 45 align to define a common axis 52 that is inclined upwardly from front leg 44 toward rear leg 45. This facilitates assembly by providing a more open installation angle for shifter 12, as discussed below.

Rear bracket 41 (FIG. 1) includes legs 54 and 55 and a center panel 56 interconnected to form an inverted U shape. Legs 54 and 55 are attached to vehicle floor pan 42. Center panel 56 includes a pair of spaced square apertures 57 for receiving Z clips 88 on shifter 12, as described below.

Figure 1:
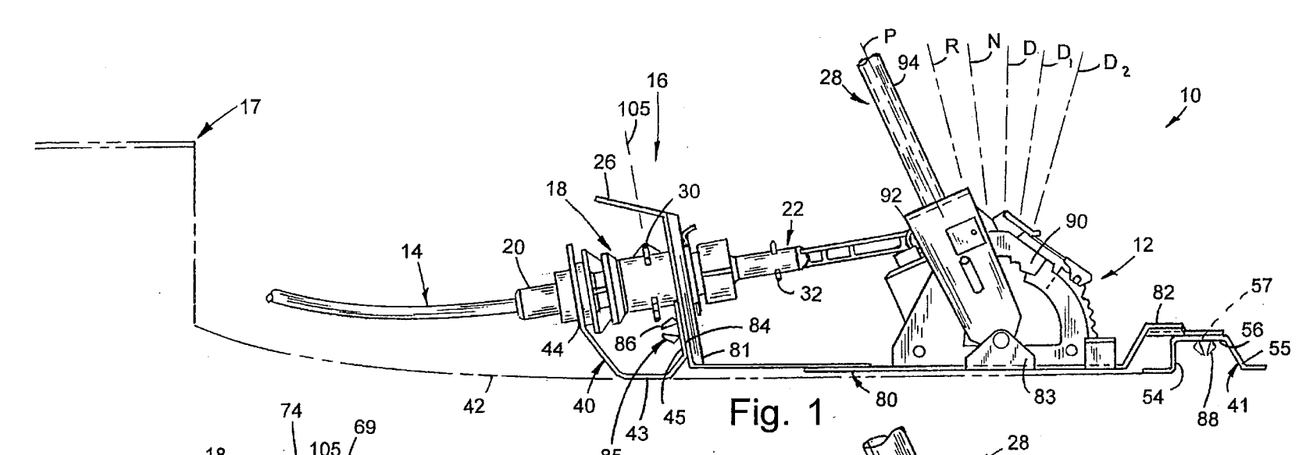
FIG. 1 is an elevational view of a shifter including a cable connection embodying the present invention.

Cable assembly 14 (FIG. 3) includes a sleeve 60 and a telescopable cable 61 slideably positioned therein. Sheath 20 is molded onto sleeve 60 as an integral part of sleeve 60. Cable rod 24 is secured to cable 61 such as by crimping or deforming the end 62' of cable rod 24. Cable rod 24 is slideably positioned in sheath 20, and includes a protruding end 62 that extends rearwardly beyond an end of the sheath 20. Sheath 20 includes a bore 63 that receives cable rod 24. Bores 63 and 102" (FIG. 2) have increasing diameters along the rear portion of their lengths so that the protruding end 62 of cable rod 24 can be moved radially in a direction "A" to accommodate the non-linear movement of connector rod 22 as shift mechanism 28 is pivoted between gear positions "P," "R," "N," "D," "D1," and "D2" (FIG. 1). A plurality of gussets 70 are provided on sheath 20 (FIG. 3) between flange 67 and the anchor-engaging end 69 of sheath 20. Gussets 70 are radially inclined to and merge with a first cylindrical surface 71. The extreme end of sheath 20 includes a second cylindrical surface 72, and a second frustoconical surface 73 between which is located a circumferential ring-shaped depression 74 for receiving retainer clip 114.

Figure 6:
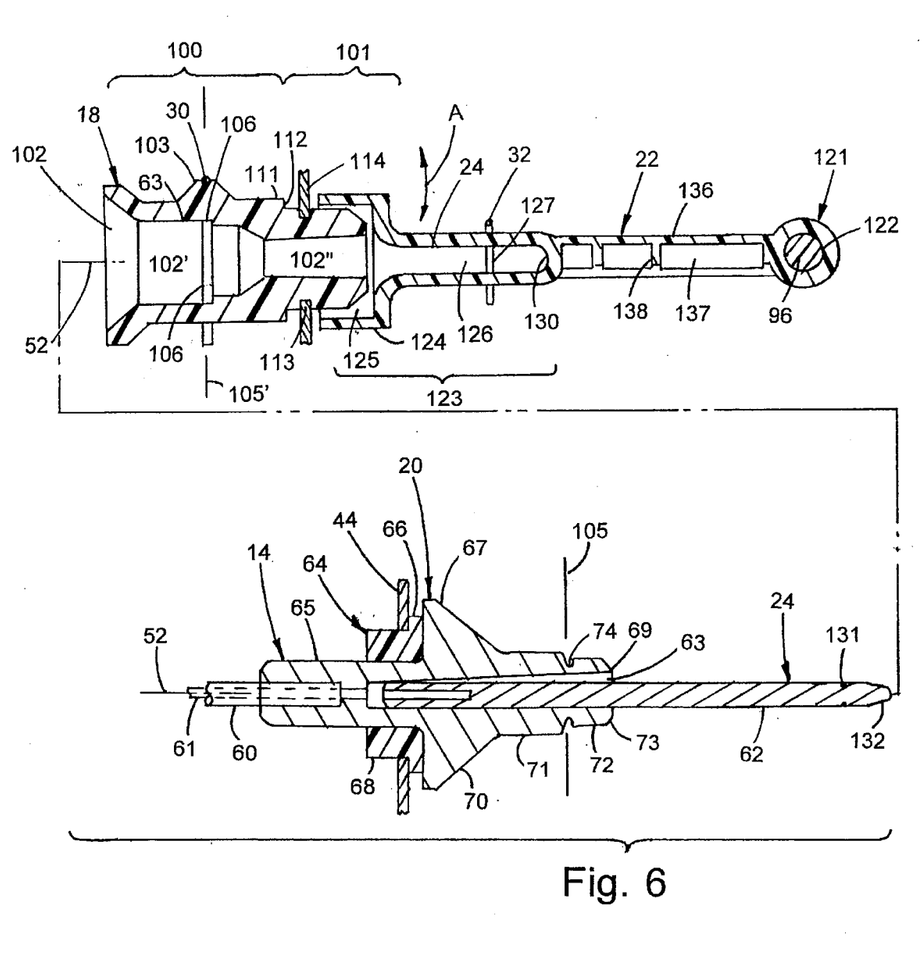
FIG. 6 is a cross-sectional view of the anchor and connector rod as shown in FIG. 2.

A foam rubber washer 64 (FIG. 6) is positioned on the shifter-remote end 65 of sheath 20. Washer 64 includes a circumferential lip 66 that butts against a radially extending flange 67 on sheath 20. Lip 66 provides a cushion between sheath flange 67 and mounting bracket front leg 44. Washer 64 further includes a cylindrical stem 68 that extends through aperture 46 in mounting bracket front leg 44. The resiliency of washer 64 frictionally retains sheath 20 on front leg 44, yet permits sheath 20 to pivot and move angularly into alignment with anchor 18 during installation of anchor 18 onto sheath 20. Cable assembly 14 can be installed onto mounting bracket 40 by sliding sleeve 60 through slot 47 into aperture 46 (FIG. 3), and then by moving sheath 20 forwardly so that washer 64 and sheath 20 mateably frictionally engage aperture 46 in bracket 40. Washer 66 is preferably made from an injection moldable foam rubber having a density of about 10–30 lbs./ft$^3$ although it is contemplated that various materials and material densities can be used. It is important that lip 66, when compressed, provide a force equal to or greater than the force required to push surface 72 through clip 30 to the point where clip 30 snaps into groove 74. The distance that the lip 66 compresses takes up the stack-up tolerances between the pars, including parts 22, 62, 66, 67, 74 and 127. Also, rod 62 in most cases will bottom out or nearly bottom out in bore 126 when clip 32 snaps into groove 131. In the illustrated arrangement, lip 66 is about 11 mm in its free, uncompressed state, and about 4 mm after installation as compressed. It is contemplated that a compression spring or Bellville spring could be used in place of washer 64/lip 66 in some cases, but the foam washer is preferable since it prevents rattle.

Figure 3:
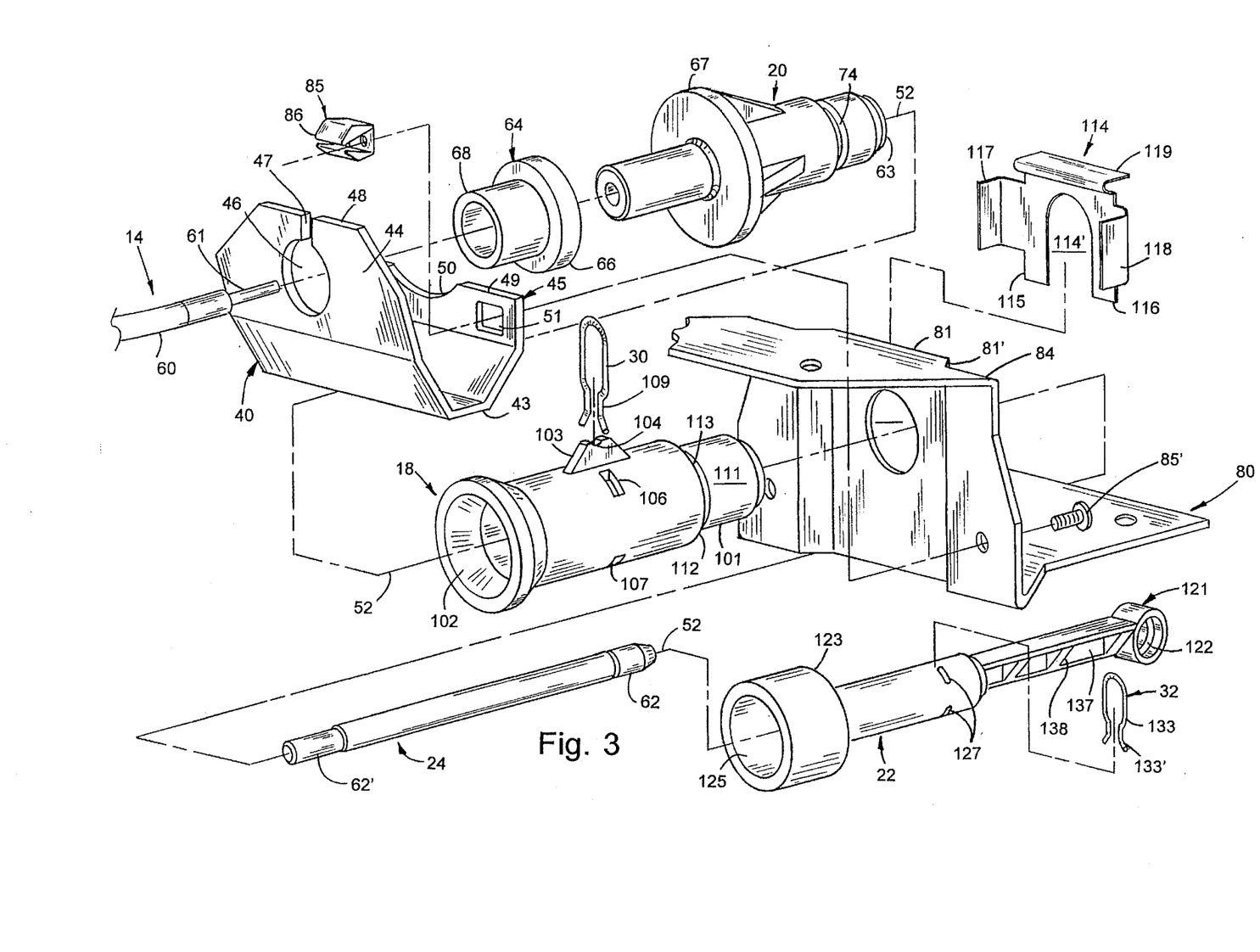
FIG. 3 is an exploded perspective view of the cable connection shown in FIG. 1.

Shifter 12 (FIG. 1) includes a base 80 having a front flange 81, a rear flange 82, an opposing pivot-forming flanges 83 on each side. Front flange 81 extends generally parallel to the rear leg 45 of vehicle mounting bracket 40 when shifter 12 is installed. A pair of Z clips or spring steel snap-in clips 85 are secured to the offset flanges 84 on shifter front flange 81. The resilient legs 86 of the Z clips 85 align with square holes 51 on rear leg 45 of mounting bracket 40 (FIG. 3). An aperture 87 in front flange 81 aligns with aperture 46 and arcuate section 50 on bracket 40 along axis 52. A second pair of Z clips 88 (FIG. 1) are attached to the rear flange 82 of base 80, and are arranged and configured to snap into and securely engage square holes 57 in rear bracket 41. Z clips 85 and 88 are secured to front flange 81 and rear flange 82, respectively, by screws 85' (FIG. 3).

A detent forming arch 90 (FIG. 1) extends upwardly from base 80. The underside of arch 90 includes multiple notches 91 forming gear positions "P," "R," "N," "D," "D1," and "D2". Shift mechanism 28 includes an inverted U-shaped member 92 that is pivotally secured to pivot-forming flanges 83 on base 80 by pivot pins 93. A shift lever 94 is secured to pivot member 92, and a pawl 95 for engaging notches 91 is operably secured to pivot member 92. A finger 96 (FIG. 2) protrudes laterally from pivot member 92 for rotatably engaging connector rod 22. It is contemplated that connector rod 22 can be held on finger 96 by several different ways. In particular, where a solenoid or cam structure is to be secured to pivot member 92 for sensing the location of pawl 95, such as for use in a brake-ignition-transmission-shift-interlock system, the structure can be attached after connector rod 22 and used to hold connector rod 22 on finger 96. A feel positioner 97 including a depression-defining comb 98 attached to arch 90 and a spring biased roller 99 attached to pivot member 92 is included on shifter 12 to provide better feel to an operator of shifter 12 when shift mechanism 28 is moved between gear positions.

Figure 2:
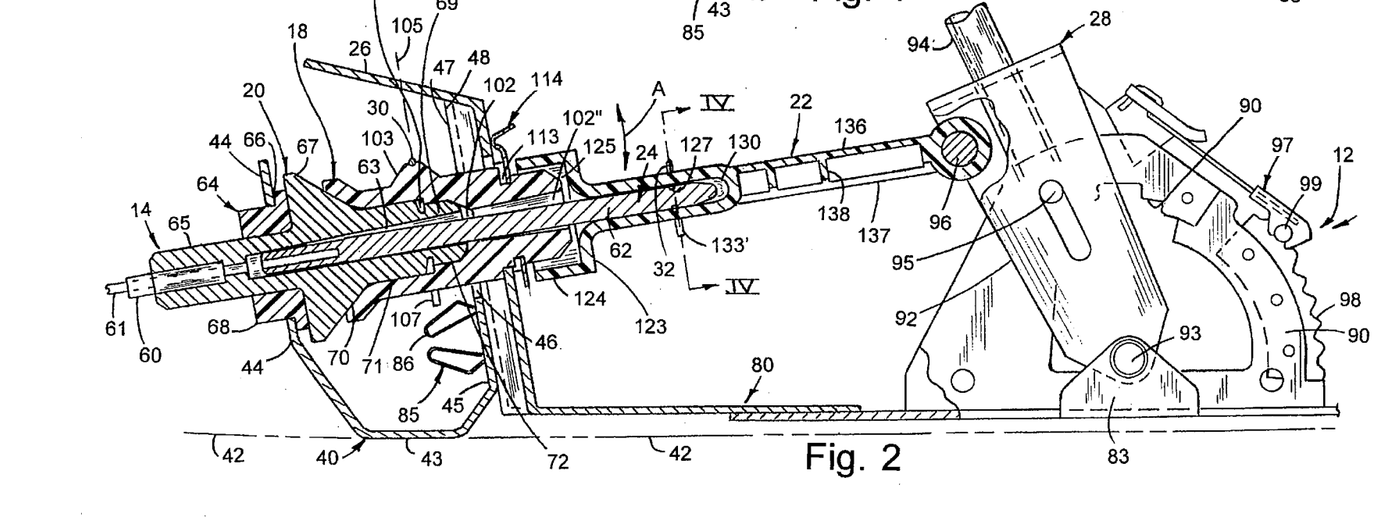
FIG. 2 is an enlarged view, partially in cross section, of the shifter shown in FIG. 1.
Figure 5:
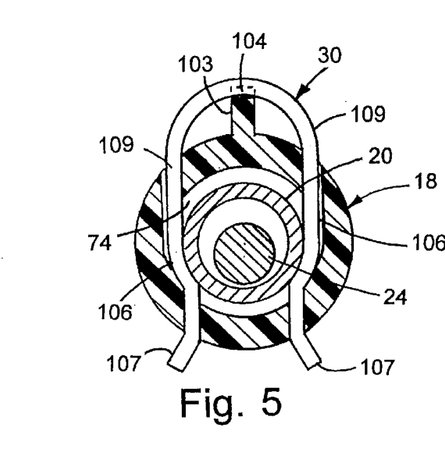
FIG. 5 is a cross sectional view taken along the plane V—V in FIG. 2.

Anchor 18 (FIG. 6) includes a tail section 100 and a nose 101, and further includes a multi-diameter bore 102 that extends axially entirely through anchor 18 along axis 52. The section of bore 102 within tail section 100 includes a shaped surface 102' configured to mateably engage surfaces 71, 72 and 73 on sheath 20 (FIG. 2). Notably, there is clearance between gusset 70 and bore 102 to facilitate assembly. The exterior wall of tail section 100 is sufficiently thick and is made of a stable structural polymeric material so that it can structurally engage and support sheath 20. King-shaped depression 74 in sheath 20 defines a plane 105 that is generally perpendicular to axis 52 (FIG. 1) and that is alignable with plane 105' in anchor 18. A rib 103 (FIG. 3) on the outer surface of anchor 18 extends perpendicular through plane 105', and a notch 104 is located on rib 103 in plane 105'. A pair of parallel apertures or channels 106 located in plane 105' extend through tail section 100. Channels 106 are located a predetermined distance apart such that they extend tangentially through ring-shaped depression 74 (FIG. 5). The ends 107 of channels 106 opposite rib 103 are spaced slightly closer together than the ends of channels 106 proximate rib 103. Channels 106 are configured to receive the legs 109 of a U-shaped spring clip or retainer 30. The legs 109 of clip 30 are deformed so that clip 30 snaps into a predetermined position in channels 106 on anchor 18. The location of notch 104 on rib 103 and channel ends 107 accurately locate clip 30 in anchor 18. Channels 106 securely retain clip 30, but include enough clearance so that the legs 109 can be spread apart slightly, thus allowing cable sheath 20 to be snapped into bore 102 in anchor tail section 100 to facilitate assembly.

The nose 101 of anchor 18 includes an external surface 111 having a radially extending ledge or neck 112 configured to mateably engage aperture 87 (FIG. 3) in shifter base front flange 81. A depression 113 (FIG. 6) is spaced from ledge 112 a distance at least as great as the thickness oft he base flange 81 (FIG. 3). A U-shaped sheet metal retainer 114 (FIG. 3)includes opposing legs 115 and 116 spaced a predetermined distance apart so that legs 115 and 116 mateably engage depression 113 to hold anchor 18 securely to flange 81. Retainer 114 further includes reinforcing webs 117 and 118 that extend from legs 115 and 116 and define aperture 114'. Webs 117 and 118 engage the offset ridges 81' in base flange 81 and cause retainer 114 to stand away from flange 81 a small distance. This gives the central part of retainer 114 a degree of resiliency in an axial direction along axis 52, thus allowing the retainer 114 to compensate for some dimensional variation between anchor 18, sheath 20 and retainer 114. A flange 119 at the top of retainer 114 also rigidifies retainer 114, and provides a handle for removing or installing retainer 114.

The protruding end of nose 101 is tapered to facilitate assembly of the ball-shaped end 123 of connector rod 22 (FIG. 6) onto nose 101. The section 102" of multi-diameter bore 102 within nose 101 includes a frustoconical surface configured to align with the bore 63 in sheath 20. (See FIG. 2.) Thus, bore 102 within nose 101 allows cable rod 24 to move angularly and radially from axis 52 in direction "A." Thus, bore 102 aligns with and compliments bore 63 in sheath 20.

Figure 4:
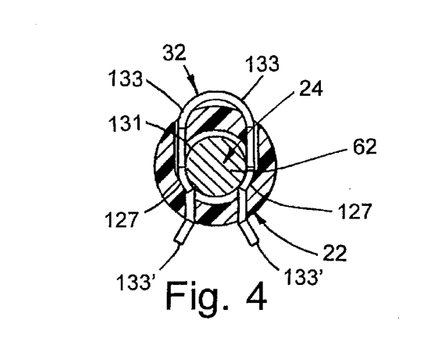
FIG. 4 is a cross sectional view taken along the plane IV—IV in FIG. 2.

Connector rod 22 (FIG. 6) includes a first end 121 having a transverse hole 122 therein for rotatably engaging finger 96 on shift mechanism 28. Connector rod 22 further includes a second end 123 that is generally bell-shaped. Specifically, the end 123 includes a cylindrically-shaped flange 124 that defines a pocket 125 large enough to loosely receive nose 101. This provides clearance as connector rod 22 moves non-linearly with cable rod 24 as shift mechanism 28 is pivoted. Bell-shaped flange 124 holds connector rod 22 on anchor 18 when shifter 12 has been preassembled as a unit, but before shifter 12 is attached to cable assembly 14 or to the vehicle. A second pocket 126 extends axially into connector rod 22 from pocket 125. Second pocket 126 has a diameter chosen to mateably securely receive the protruding end 62 of cable rod 24. A pair of spaced parallel channels 127 (FIG. 4) are located in second end 123 at a location spaced axially from the bottom 130 (FIG. 6) of second pocket 126. A ring-shaped depression 131 is located on protruding end 62 of cable rod 24, and the protruding end 62 is tapered at its outermost tip 132. Channels 127 are shaped to receive the legs 133 of a retainer or U-shaped spring clip 32. The ends 133' of legs 133 snap lock into channels 127 and onto cable rod 24 much like clip 30 engages anchor channels 106 and sheath 20. Further there is some clearance within channels 127 for clip legs 133 so that the legs 133 can flex to receive cable rod 24. Also, the distance from ring-shaped depression 131 to tip 132 is about 0.2 mm less than the distance from pocket bottom 130 to channels 127. Thus, cable rod 24 snap locks into connector rod 22 when cable rod 24 is forced into second pocket 126. Connector rod 22 further includes a shaft 136 having axially extending sides 137 and transverse stiffening webs 138. It is contemplated that various shaft configurations can be used. The illustrated shaft 136 is advantageous in that the lower part of the shaft is open to facilitate molding of connector rod 22.

After cable assembly 14 has been installed, shifter 12 is installed in the vehicle by manipulating the shifter 12 to insert anchor 18 onto the sheath 20 with the cable rod 24 extending through anchor 18 into the connector rod 22. As bracket 26 of shifter 12 is snap attached to mounting brackets 43 and 41 by Z clips 85 and 88 on shifter base 12, anchor 18 is simultaneously snap attached to the sheath 20 by the first spring clip 30, and the connector rod 22 is snap attached to the cable rod 24 by the second spring clip 32. The force of assembly may vary, but is contemplated that it will optimally be about 5–10 pounds of force for the cable assembly connection to the shifter. Once properly connected, the pull apart force is quite large unless clips 85 and 88 are removed. Thus, the assembly of shifter 12 to the vehicle can be completed with a single efficient operation/motion. It is noted that a pair of cable connectors (16) can be used on a shifter where a pair of cable assemblies must be operably connected to a shifter.

In the foregoing description, it will be readily appreciated by those skilled in the art that modifications may be made to the invention without departing from spirit of the concepts disclosed herein. Such modifications are to be considered as covered by the following claims, as interpreted by patent laws in the United States including the Doctrine of Equivalents.

The embodiments of the invention in which an exclusive property or privilege is claimed are defined as follows:

1. In combination, an apparatus comprising:
   a vehicle mounting bracket;
   a cable assembly including a cable; a sheath engaging said vehicle mounting bracket and including a first bore; and a telescopable member attached to said cable received in said bore and extending from said sheath;
   a shifter including a base having a cable assembly mounting bracket and further including a gear shift mechanism;
   an anchor attached to said shifter base securing said sheath to said cable assembly mounting bracket of said shifter base;
   said anchor including a second bore receiving said sheath and said telescopable member;
   said telescopable member being slid able within at least one of said first or second bores;
   an elongated connector rod operably securing said telescopable member to said gear shift mechanism; and
   a first end of said connector rod including an aperture receiving the telescopable member and a second end of said connector rod connected to said gear shift mechanism.

2. An apparatus as defined in claim 1 including means holding said connector rod in alignment with said anchor until said telescopable member and said connector rod are operably secured together.

3. An apparatus as defined in claim 1 wherein said sheath includes a support member supporting said sheath on said vehicle mounting bracket, said support member permitting angular movement of said sheath so that said sheath can be aligned with said anchor as said anchor is installed onto said sheath.

4. An apparatus as defined in claim 3 wherein said support member comprises a resilient washer permitting said angular movement of said sheath.

5. An apparatus as defined in claim 4 wherein said anchor receives said sheath at an unobstructed non-horizontal angle to facilitate assembly of said anchor onto said sheath as the shifter is assembled to said vehicle mounting bracket.

6. In combination, an apparatus comprising:
   a vehicle mounting bracket;
   a cable assembly including a sheath engaging said vehicle mounting bracket and further including a telescopable member extending from said sheath;

a shifter including a base having a cable assembly mounting bracket and further including a gear shift mechanism;

an anchor attached to said shifter base securing said sheath to said cable assembly mounting bracket of said shifter base;

a connector rod operably securing said telescopable member to said gear shift mechanism;

means for holding said connector rod in alignment with said anchor until said telescopable member and said connector rod are operably secured together; and a first retainer securing said anchor to said sheath on the cable assembly.

7. An apparatus as defined in claim 6 including a second retainer securing said connector rod to the telescopable member on the cable assembly.

8. An apparatus as defined in claim 7 wherein said first and second retainers simultaneously attach said anchor to said sheath, and said connector rod to said telescopable member, respectively.

9. In combination, an apparatus comprising:
a vehicle mounting bracket;
a cable assembly including a sheath engaging said vehicle mounting bracket and further including a telescopable member extending from said sheath;
a shifter including a base having a cable assembly mounting bracket and further including a gear shift mechanism;
an anchor attached to said shifter base securing said sheath to said cable assembly mounting bracket of said shifter base;
a connector rod operably securing Said telescopable member to said gear shift mechanism; and
said connector rod includes an alignment flange engaging said anchor to hold said connector rod in alignment with said anchor until said telescopable member is connected thereto.

10. In combination, an apparatus comprising:
a vehicle mounting bracket;
a cable assembly including a sheath engaging said mounting bracket and further including a telescopable member extending from said sheath;
a shifter including a base having a cable assembly mounting bracket and further including a gear shift mechanism;
an anchor attached to said shifter base for securing said sheath to said cable assembly mounting bracket of said shifter base;
a connector rod for operably securing said telescopable member to said gear shift mechanism; and
said connector rod having a first end which includes an aperture for receiving the telescopable member, said aperture being tapered to facilitate entry of the telescopable member therein.

11. A vehicle shifter for connection to a cable assembly, comprising:
a base;
a shift mechanism movably operably connected to said base;
an anchor attached to said base, said anchor including a first bore extending through said anchor and configured to mateably engage a sheath of the cable assembly; and
a connector rod operably connected to said shift mechanism, said connector rod including a second bore alignable with said first bore and mateably engaging a telescopable cable rod extending from the sheath of the cable assembly; and said anchor includes a first fastener snap attached to said sheath.

12. A vehicle shifter as defined in claim 11 wherein said connector rod includes a second fastener snap attached to said cable rod.

13. A vehicle shifter for connection to a cable assembly including a sheath, comprising:
a base;
a shift mechanism movably operably connected to said base;
an anchor attached to said base, said anchor including a first bore extending through said anchor and configured to mateably engage the sheath of the cable assembly; and
a connector rod operably connected to said shift mechanism, said connector rod including a second bore alignable with said first bore and configured to mateably engage a telescopable cable rod extending from the sheath of the cable assembly; and
said connector rod including a flange engaging said anchor to maintain the alignment of said second bore within said first bore until the shifter is assembled to the cable assembly.

14. A method comprising:
providing a vehicle including a mounting bracket and further including a transmission shift cable assembly having a sheath and a telescopable cable rod, the sheath being secured to the mounting bracket;
providing a shifter including a shifter mechanism, a cable connector having an anchor for engaging the sheath and a connector rod for engaging the telescopable cable rod, at least one of the anchor and the connector rod being configured to snap lock onto a corresponding one of the sheath and the telescopable cable rod, respectively;
manipulating the shifter to extend the sheath into the anchor and to extend the telescopable cable rod into the connector rod; and
attaching said at least one of the anchor and the connector rod to said corresponding one of the sheath and the telescopable cable rod as the shifter is moved to an installed position in the vehicle.

15. A method as defined in claim 14 wherein both the anchor and the connector rod snap attach to the sheath and the telescopable cable rod, respectively, as the shifter is moved to the installed position.

16. In combination, a vehicle shifter assembly comprising:
a vehicle mounting bracket;
a cable assembly including a sheath engaging said vehicle mounting bracket and further including a cable rod extending from said sheath;
a shifter including a shifter base having a cable assembly mounting bracket and further including a gear shift mechanism;
an anchor attached to said shifter base, a first retainer securing said anchor to the sheath on the cable assembly and thereby securing said sheath to said mounting bracket of said shifter base;
a connector rod operably securing said cable rod to said gear shift mechanism;
said anchor being elongated and having a bore extending entirely therethrough, one end of said bore mateably engaging the sheath with a portion of the cable rod extending from another end of said anchor; said connector rod having a first rod end mateably engaging the cable rod extending from said anchor and a second rod end mateably engaging the gear shift mechanism.

17. The combination as defined in claim 16 wherein said anchor and said first retainer are snap attached to the sheath.

18. The combination as defined in claim 16 including a second retainer securing said connector rod to the cable rod on the cable assembly.

19. The combination as defined in claim 18 wherein said connector rod and said second retainer are snap attached to the cable rod.

20. The combination as defined in claim 18 wherein said mounting bracket of said shifter base has an apertured flange and including a third retainer securing said anchor to the apertured flange on the shifter base.

21. The combination as defined in claim 18 wherein said first and second retainers are simultaneously engaged.

22. The combination as defined in claim 21 wherein said first and second retainers are attached as the shifter is positioned in an installed position in a vehicle.

23. In combination, a vehicle shifter assembly comprising:

a vehicle mounting bracket;

a cable assembly including a sheath engaging said vehicle mounting bracket and further including a cable rod extending from said sheath;

a shifter including a shifter base having a cable assembly mounting bracket and further including a gear shift mechanism;

an anchor attached to said shifter base securing said sheath to said mounting bracket of said shifter base;

a connector rod operable securing said cable rod to said gear shift mechanism;

said anchor being elongated and having a bore extending entirely therethrough, one end of said bore mateably engaging the sheath with a portion of the cable rod extending from another end of said anchor; said connector rod having a first rod end mateably engaging the cable rod and extending from said anchor and a second rod end mateably engaging the gear shift mechanism; said anchor being snap attached to the sheath and said connector rod being snap attached to the cable rod.

24. In combination, a vehicle shifter assembly comprising:

a vehicle mounting bracket;

a cable assembly including a sheath engaging said vehicle mounting bracket and further including a cable rod extending from said sheath;

a shifter including a base having a cable assembly mounting bracket and further including a gear shift mechanism;

an anchor attached to said shifter base securing said sheath to said mounting bracket of said shifter base;

a connector rod operably securing said cable rod to said gear shift mechanism;

said anchor being elongated and having a bore extending entirely therethrough, one end of said bore mateably engaging the sheath with a portion of the cable rod extending from another end of said anchor; said connector rod having a first rod end mateably engaging the cable rod and extending from said anchor and a second rod end mateably engaging the ear shift mechanism; means for holding said connector rod in alignment with said bore in said anchor until the cable rod and the sheath are operably secured together; said means including an alignment flange engaging said anchor holding said connector rod in alignment with said anchor until the cable rod is connected thereto.

25. The combination as defined in claim 24 wherein said anchor includes a nose and said alignment flange is bell-shaped and receives the nose of said anchor.

26. The combination as defined in claim 25 wherein said alignment flange defines a pocket significantly larger than the nose of said anchor such that the nose of said anchor can move radially within said alignment flange to accommodate non-axial movement as the shift mechanism on the shifter moves through an arc between gear positions.

27. In combination, a vehicle shifter assembly comprising;

a vehicle mounting bracket;

a cable assembly including a sheath engaging said vehicle mounting bracket and further including a cable rod extending from said sheath;

a shifter including a base having a cable assembly mounting bracket and further including a gear shift mechanism;

an anchor attached to said shifter base securing said sheath to said mounting bracket of said shifter base;

a connector rod operably securing said cable rod to said gear shift mechanism;

said anchor being elongated and having a bore extending entirely therethrough, one end of said bore mateably engaging the sheath with a portion of the cable rod extending from another end of said anchor; said connector rod having a first rod end mateably engaging the cable rod and extending from said anchor and a second rod end mateably engaging the gear shift mechanism said mounting bracket of said shifter base including an apertured flange and a U-shaped clip securing said anchor to said apertured flange.

28. In combination, a vehicle shifter assembly comprising;

a vehicle mounting bracket;

a cable assembly including a sheath engaging said vehicle mounting bracket and further including a cable rod extending from said sheath;

a shifter including a base having a cable assembly mounting bracket and further including a gear shift mechanism;

an anchor attached to said shifter base securing said sheath to said mounting bracket of said shifter base, said anchor having a first end and a second end;

a connector rod operably securing said cable rod to said gear shift mechanism;

said anchor being elongated and having a bore extending entirely therethrough, one end of said bore being frustoconically-shaped and mateably engaging the sheath with a portion of the cable rod extending from another end of said anchor; said connector rod having a first rod end mateably engaging the cable rod and extending from said anchor and a second rod end mateably engaging the gear shift mechanism; said first rod end of said connector rod includes an aperture receiving the cable rod, the aperture being tapered to facilitate entry of the cable rod therein.

* * * * *

UNITED STATES PATENT AND TRADEMARK OFFICE
CERTIFICATE OF CORRECTION

PATENT NO.   : 5,662,004
DATED        : September 2, 1997
INVENTOR(S)  : Charles Osborn et al.

It is certified that error appears in the above-identified patent and that said Letters Patent is hereby corrected as shown below:

Column 3, Line 57;

"pars" should be --parts--.

Column 4, Line 44;

"King-shaped" should be --Ring-shaped--.

Column 5, Line 3;

"oft he" should be --of the--.

Column 6, Claim 1, Line 37;

"slid able" should be --slidable--.

UNITED STATES PATENT AND TRADEMARK OFFICE
CERTIFICATE OF CORRECTION

PATENT NO. : 5,662,004
DATED : September 2, 1997
INVENTOR(S) : Charles Osborn et al.

It is certified that error appears in the above-identified patent and that said Letters Patent is hereby corrected as shown below:

Column 9, Claim 24, Line 64;

"ear" should be --gear--.

Signed and Sealed this

Seventh Day of April, 1998

Attest:

BRUCE LEHMAN

*Attesting Officer*  *Commissioner of Patents and Trademarks*